US012698159B2

(12) United States Patent

Tocháček et al.

(10) Patent No.: US 12,698,159 B2

(45) Date of Patent: Aug. 4, 2026

(54) MATERIAL HANDLING APPARATUS

(71) Applicant: Intelligrated Headquarters, LLC, Mason, OH (US)

(72) Inventors: Jakub Tocháček, Brno (CZ); Jaroslav Tesař, Brno (CZ)

(73) Assignee: Intelligrated Headquarters, LLC, Mason, OH (US)

( * ) Notice: Subject to any disclaimer, the term of this patent is extended or adjusted under 35 U.S.C. 154(b) by 242 days.

(21) Appl. No.: 18/419,671

(22) Filed: Jan. 23, 2024

(65) Prior Publication Data

US 2025/0236466 A1 Jul. 24, 2025

(51) Int. Cl.
B65G 13/11 (2006.01)
B65G 39/12 (2006.01)

(52) U.S. Cl.
CPC .............. B65G 13/11 (2013.01); B65G 39/12 (2013.01)

(58) Field of Classification Search
None
See application file for complete search history.

(56) References Cited

U.S. PATENT DOCUMENTS

| | | | | | |
|---|---|---|---|---|---|
| 5,964,337 A | * | 10/1999 | Hallahan | ................ | B65G 13/11 198/780 |
| 6,161,681 A | * | 12/2000 | Kalm | ..................... | B65G 39/12 198/790 |
| 6,367,617 B1 | * | 4/2002 | Schiesser | ............... | B65G 39/12 198/782 |
| 7,243,784 B2 | * | 7/2007 | Cotter | .................... | B65G 13/11 193/35 J |
| 2007/0248294 A1 | * | 10/2007 | Jager | ..................... | B65G 21/06 384/295 |

* cited by examiner

*Primary Examiner* — Kavel Singh
(74) *Attorney, Agent, or Firm* — Alston & Bird LLP

(57) ABSTRACT

According to the embodiments illustrated herein, an axle mount is illustrated. The axle mount includes a base portion. Further, the axle mount includes a neck portion extending out from the base portion, the neck portion being rotatably receivable on a frame of a conveyor apparatus. Additionally, the axle mount includes a seat portion disposed on the neck portion, the seat portion having a surface defining a first recess to receive an end of a roller.

19 Claims, 8 Drawing Sheets

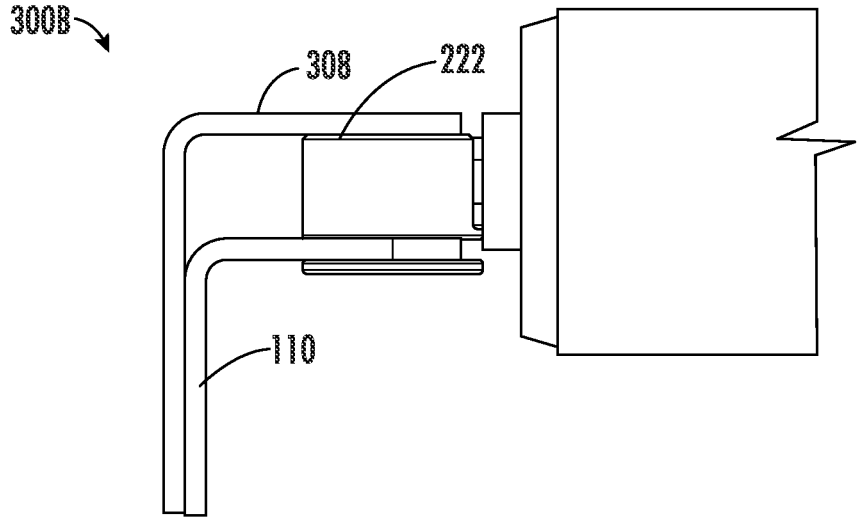
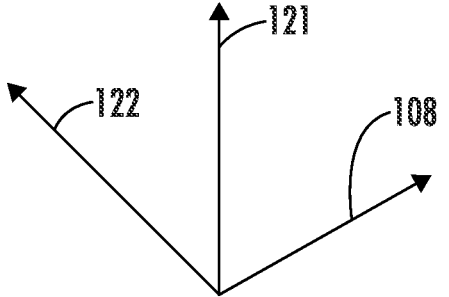
FIG. 3B

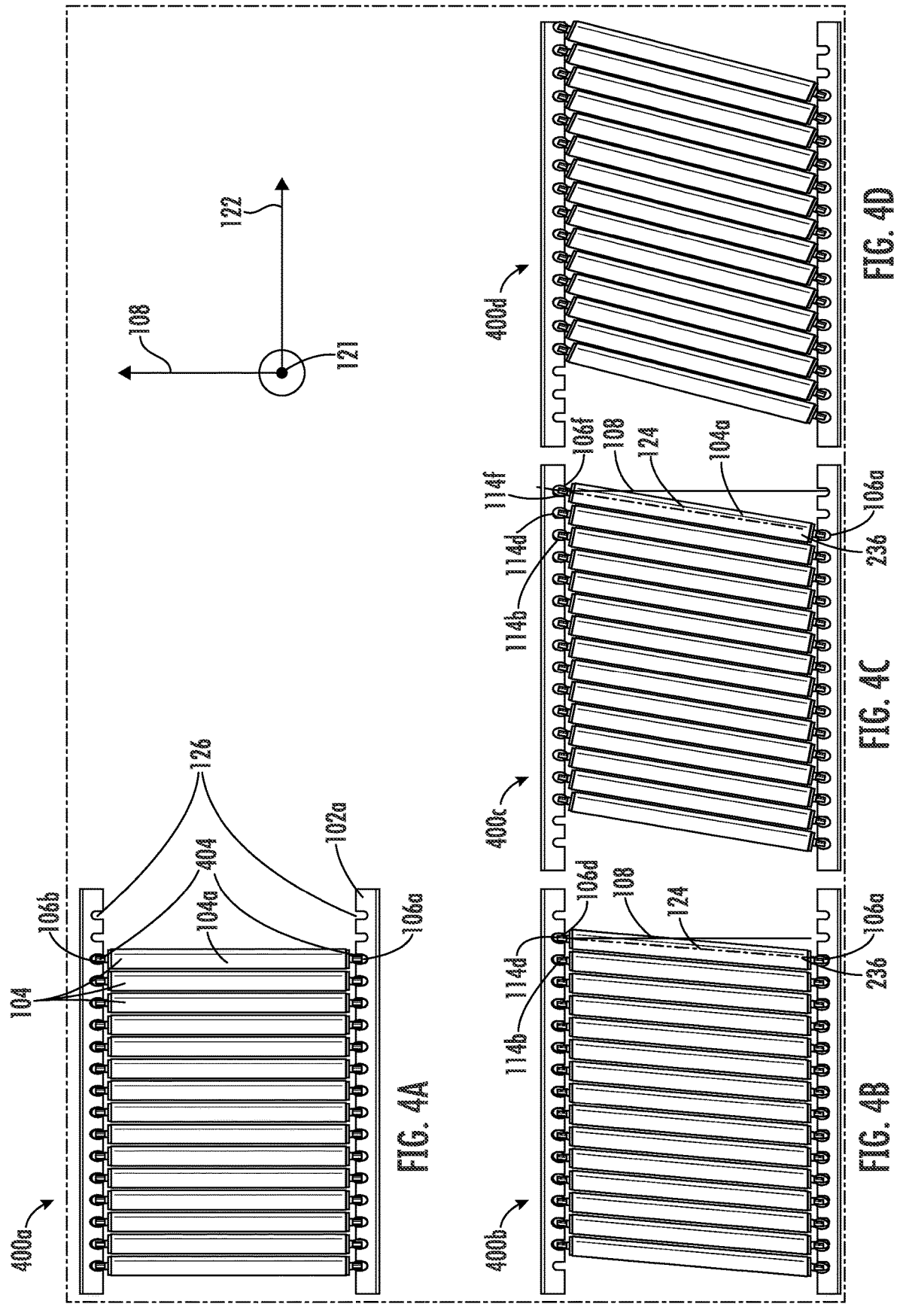

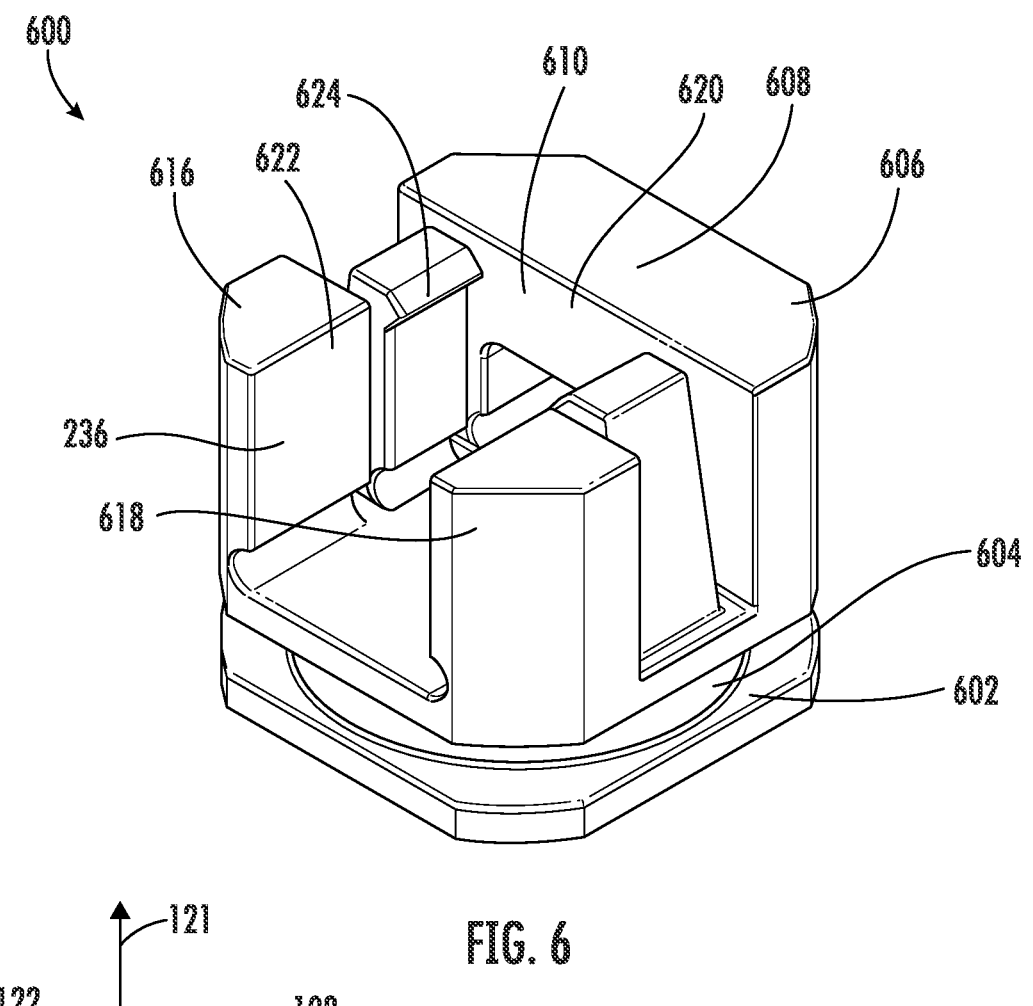
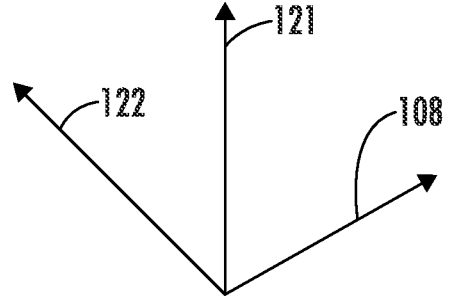
FIG. 6

700

616

624

622

708

702

620

604

602

121

122

108

MATERIAL HANDLING APPARATUS

TECHNOLOGICAL FIELD

Exemplary embodiments of the present disclosure relate generally to a material handling apparatus and, more particularly, to an axle mount apparatus for the material handling apparatus.

BACKGROUND

A typical material handling apparatus corresponds to a device or an apparatus that may be configured to facilitate traversal of one or more objects from a first location to a second location. Some examples of the material handling apparatus may include, but are not limited to, a conveyor apparatus, a robotic apparatus, unmanned vehicles, and/or the like. Usually, in a warehouse environment, the conveyor apparatus facilitates traversal the one or more objects between the first location and the second location along a conveying path (defined by the conveyor apparatus).

A typical conveyor apparatus comprises one or more rollers that may be configured to rotate to facilitate movement/traversal of the one or more objects. In some examples, the one or more rollers of the conveyor apparatus may be installed in one or more orientations (in the conveyor apparatus) to define a conveyance direction of the one or more objects. For example, the one or more rollers may be installed at a predetermined angle with respect to frames of the conveyor apparatus. Typically, specific rollers types are used to configure the conveyor apparatus in the one or more orientations. Accordingly configuring the conveyor apparatus in the one or more orientations may require specific components (corresponding to the specific roller types). This may further increase the overall cost and complexity of the conveyor apparatus.

Applicant has identified a number of deficiencies and problems associated with conventional conveyor apparatus. Through applied effort, ingenuity, and innovation, many of these identified problems have been solved by developing solutions that are included in embodiments of the present disclosure, many examples of which are described in detail herein.

BRIEF SUMMARY

According to the embodiments illustrated herein, an axle mount is illustrated. The axle mount includes a base portion. Further, the axle mount includes a neck portion extending out from the base portion, the neck portion being rotatably receivable on a frame of a conveyor apparatus. Additionally, the axle mount includes a seat portion disposed on the neck portion, the seat portion having a surface defining a first recess to receive an end of a roller.

According to embodiments illustrated herein a conveyor apparatus includes one or more frames having a surface defining one or more grooves along a lateral axis of the conveyor apparatus. The lateral axis is defined along a conveyance path of the conveyor apparatus. Further, the conveyor apparatus includes at least one axle mount receivable in at least one groove of the one or more grooves. The at least one axle mount includes a base portion. Further, the axle includes a neck portion extending out from the base portion, the neck portion being rotatably receivable in the at least one groove. Additionally, the axle mount includes a seat portion disposed on the neck portion, the seat portion having a surface defining a first recess to receive an end of a roller.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3a and FIG. 3b illustrate a perspective view and a side view of the axle mount mounted on a frame of the conveyor apparatus, according to the one or more embodiments described herein;

FIGS. 4A-4D illustrate one or more configurations of the conveyor apparatus, in accordance with the one or more embodiments described herein;

FIG. 6 illustrates a perspective view of yet another axle mount, in accordance with one or more embodiments described herein.

DETAILED DESCRIPTION

Figure 1:
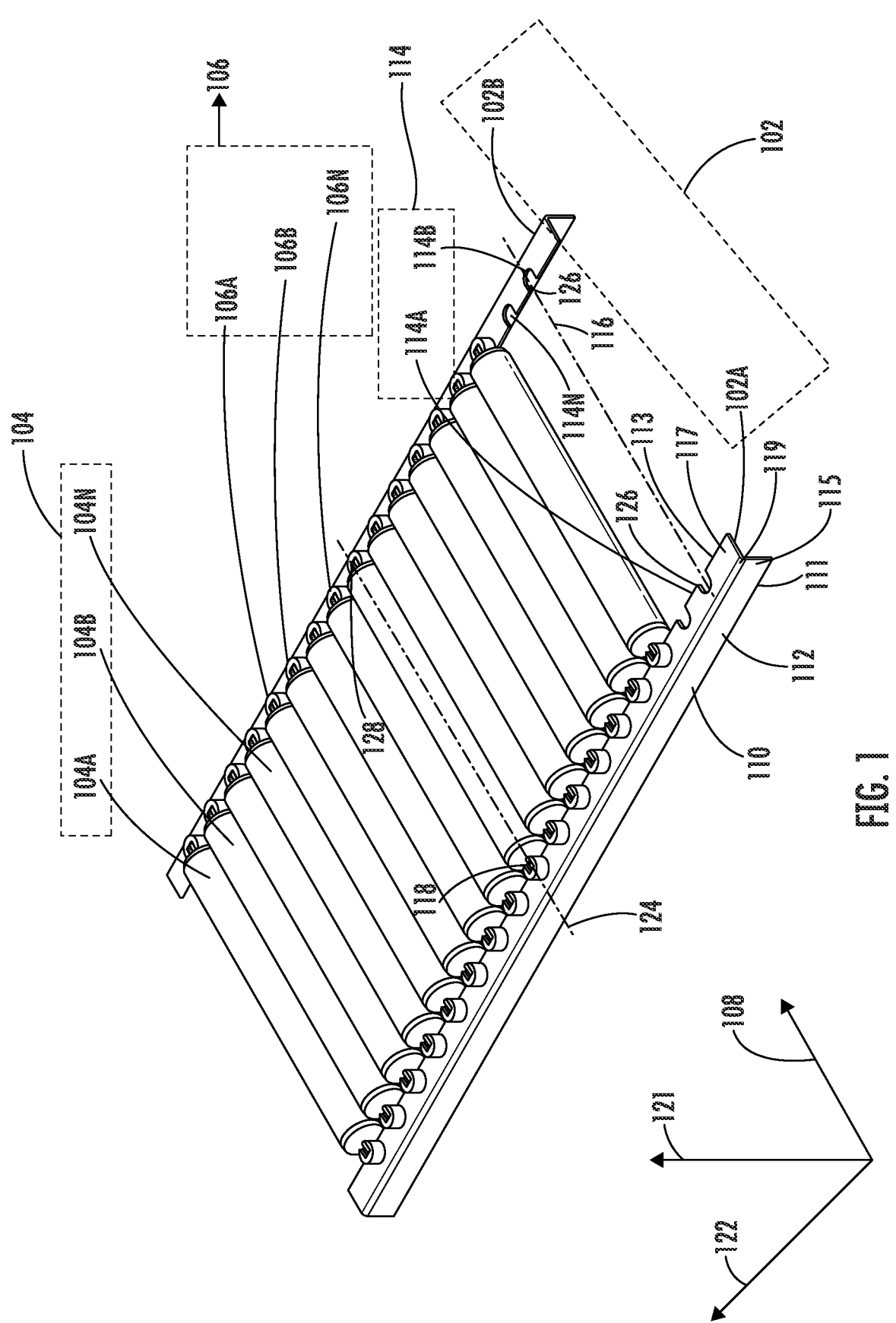
FIG. 1 illustrates a perspective view of an example conveyor apparatus, in accordance with one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

"Conveyance direction" is used herein to mean or indicate a traversal direction of one or more objects on a conveyor apparatus. In some examples, the conveyance direction is deterministic based on one or more orientations of the rollers installed in the conveyor apparatus.

"Roller orientation" is used herein to mean a predetermined angle at which the rollers are installed with respect to the frames of the conveyor apparatus. The predetermined angle of the rollers is deterministic of the conveyance direction of the conveyor apparatus.

It is commonly understood that the conveyor apparatus comprises one or more rollers that are installed on the one or more frames of the conveyor apparatus. Typically, the one or more rollers are rotatably coupled to the one or more frames through the one or more components such as, but are not limited to, nuts, and/or bolts. To reorient the one or more rollers (e.g., for the purpose of changing a conveyance direction of the conveyor apparatus), typically the complete conveyor apparatus is disassembled and reassembled with the one or more rollers positioned or installed in a different orientation. Such process is time consuming and error prone.

In an example embodiment, the conveyor apparatus may comprise the one or more frames having a surface. The surface may define one or more grooves on the frame, itself, to receive one or more axle mounts. In some examples, the one or more grooves may have a predetermined shape to facilitate reception of the one or more axle mounts. Some examples of the predetermined shape of the grooves may include, but are not limited to, a semi-circular shape, an arch shape, and a rectangular shape.

In some examples, an axle mount of the one or more axle mounts comprises a base portion, a neck portion, and a seat portion. The neck portion extends out from the base portion of the axle mount. Further, the seat portion that is disposed on the neck portion and is configured to receive a roller. The neck portion and the base portion of the axle mount may have a predetermined shape. For example, the neck portion and the base portion of the axle mount has a circular shape such that the base portion has a first radius and the neck portion has a second radius. In some examples, the first radius of the base portion is greater than the second radius of the neck portion.

In an example embodiment, the neck portion of the axle mount is receivable in the groove. In some examples a radius of the groove compliments the second radius of the neck portion of the axle mount such that the axle mount is rotatable within the groove about the neck portion. The rotatability of the axle mount with respect the frame allows the installation of the one or more rollers in the one or more orientation with respect to the one or more frame of the conveyor apparatus.

FIG. 1 illustrates a perspective view of an example conveyor apparatus 100, according to one or more embodiments described herein. The conveyor apparatus 100 includes one or more frames 102a and 102b (hereinafter referred to as the frames 102), one or more rollers 104a, 104b, . . . 104n (hereinafter referred to as the rollers 104), and one or more axle mounts 106a, 106b, . . . 106n (hereinafter referred to as the axle mounts 106).

In an example embodiment, each of the frame 102a and the frame 102b extend along a lateral axis 122 and are spaced apart from each other along a horizontal axis 108. In some examples, the distance between the frame 102a and the frame 102b is deterministic based on a length of the rollers 104 along the horizontal axis 108. In an example embodiment, each of the first frame 102a and the second frame 102b has a first plate 110 that further has a surface 112. In one embodiment, the first plate 110 is a L-shaped plate that has a first edge 111, a second edge 113, a vertical portion 115 and a horizontal portion 117. The vertical portion 115 of the first plate 110 extends along a first vertical axis 121 of the conveyor apparatus 100 between the first edge 111 and a junction 119 between the horizontal portion 117 and the vertical portion 115. The horizontal portion 117 extends between the junction 119 (between the horizontal portion 117 and the vertical portion 115) and the second edge 113 along the horizontal axis 108. In some examples, the scope of the disclosure is not limited to the first plate 110 having the L-shape. In an example embodiment, the first plate 110 may have any other shape without departing from the scope of the disclosure. For example, the first plate 110 may only include the horizontal portion 117 and may be devoid of the vertical portion 115.

In an example embodiment, the surface 112 of the first plate 110 define one or more grooves 114a, 114b, . . . , 114n (hereinafter referred to as the grooves 114) along the second edge 113. In some examples, the grooves 114 correspond to a cut-out, in the frames 102, having a predefined shape. For example, as is depicted in FIG. 1, the grooves 114 may have a semi-circular shape or an arch shape of a first radius. However, the scope of the disclosure is not limited to the grooves 114 having the semi-circular or the arch shape. In an example embodiment, the grooves 114 may have a rectangular shape or any other polygon shape without departing from the scope of the disclosure.

In some examples, the frame 102a and the frame 102b are so arranged along the horizontal axis 108 such that the grooves 114 on the frame 102a are aligned with the grooves 114 on the frame 102b. For example, for the purpose of ongoing description, two grooves 114a and 114b on the respective frames 102a and 102b are said to be aligned if the first radial axis 116 connecting of the centers of the grooves 114a and 114b is parallel to the horizontal axis 108 and is orthogonal to the lateral axis 122 (i.e., the axis along which the frame 102b and the frame 102a are placed). Such grooves (such as 114a and 114b) are hereinafter referred to as aligned grooves 126.

In an example embodiment, each of the grooves 114 is configured to receive the axle mounts 106. The structure and the operation of the axle mounts 106 is described later in conjunction with FIG. 2. In some examples, when the aligned grooves 126 (e.g., the groove 114a and the groove 114b) respectively, receive the axle mounts 106 (for example the axle mount 106a and the axle mount 106b), the axle mounts 106 are also aligned with each other. To this end, the second radial axis 124 passing through the centers of the axle mounts 106a and 106b may be parallel to the horizontal axis 108 and may be perpendicular to the lateral axis 122.

In some examples, the axle mounts 106 facilitate installation of the rollers 104 between the frame 102a and the frame 102b. For example, the axle mount 106a (installed on the frame 102a) receives a first end 118 of the roller 104a. Further, the axle mount 106b (installed on the frame 102b)

receives the second end 128 of the roller 104a. Since the axle mount 106a and the axle mount 106b are aligned with respect to each other along the horizontal axis 108, the roller 104a (installed through the axle mount 106a and the axle mount 106b) is parallel to the second radial axis 124 and is orthogonal to the lateral axis 122. Similarly, other rollers 104 are installed between the frame 102a and the frame 102b (e.g., through the aligned axle mounts 106). In one example, the rollers 104 are installed to be parallel to each other and may define the conveyance path of the conveyor apparatus 100 along the lateral axis 122

Figure 2:
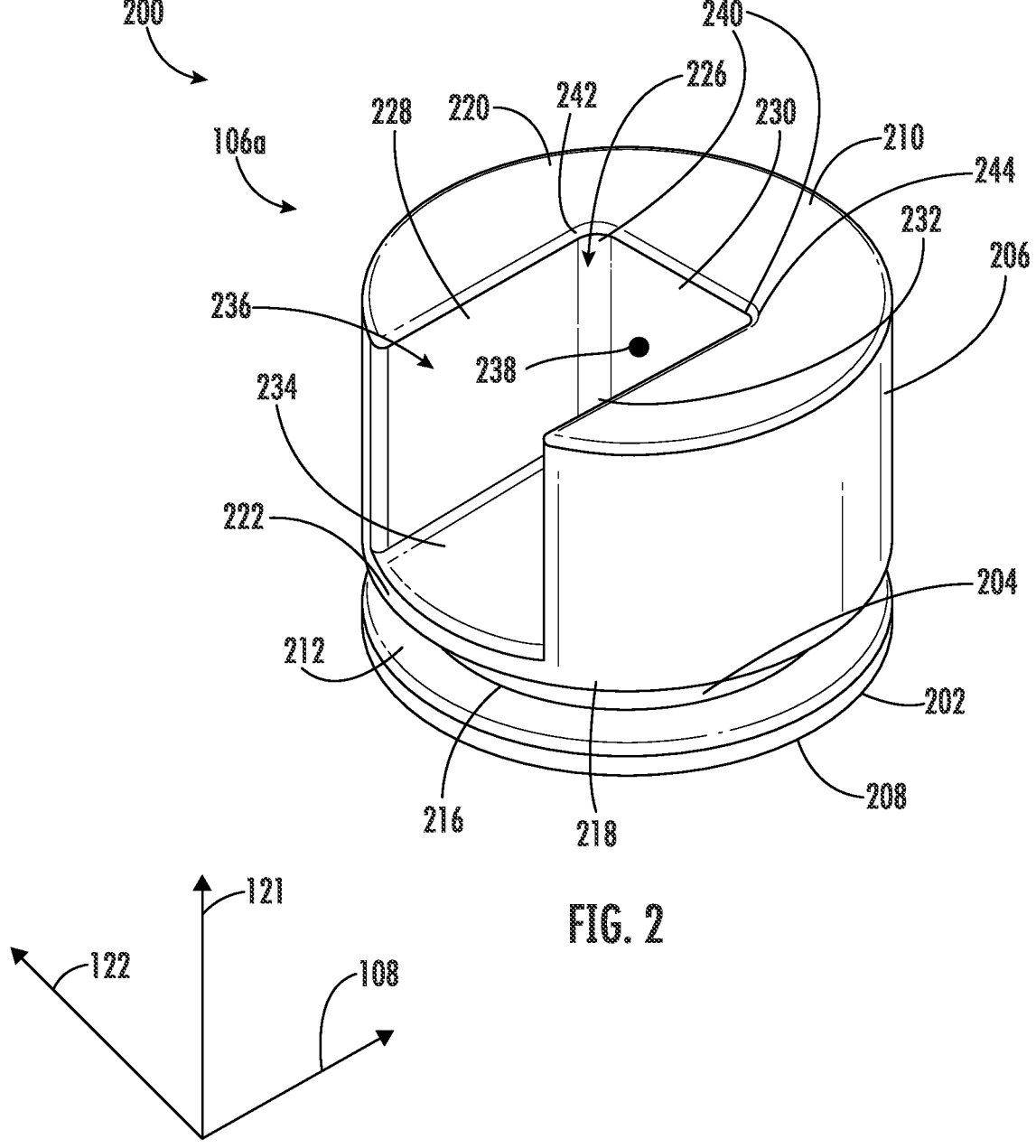
FIG. 2 illustrates a perspective view of an axle mount, in accordance with one or more embodiments described herein.

FIG. 2 illustrates a perspective view 200 of the axle mount 106a, according to one or more embodiments illustrated herein. In an example embodiment, the axle mount 106a includes a base portion 202, a neck portion 204, a seat portion 206, a first end portion 208, and a second end portion 210. In some examples, the first end portion 208 of the axle mount 106a is space apart from the second end portion 210 along the first vertical axis 121 of the conveyor apparatus 100.

In some examples, the base portion 202 of the axle mount 106a extends between the first end portion 208 of the axle mount 106a and a third end portion 212. The third end portion 212 is proximal to the first end portion 208 and is distal from the second end portion 210 of the axle mount 106a. In some examples, the base portion 202 may have a cylindrical shape such that a distance between the first end portion 208 (of the axle mount 106a) and the third end portion 212 is deterministic of a predetermined height of the base portion 202. Further, the base portion 202 have a second radius. In some examples, the scope of the disclosure is not limited to the base portion 202 having the cylindrical shape. In an alternate embodiment, the base portion 202 may have a rectangular shape, a square shape or any other shape without departing from the scope of the disclosure, as is described in FIGS. 5-7. The third end portion 212 may correspond to a platform on which the neck portion 204 is disposed. In one example, the neck portion 204 extends from the third end portion 212 towards the second end portion 210 along the first vertical axis 121. In another example, the neck portion 204 corresponds to a protrusion defined by a surface 220 of the base portion 202.

In an example embodiment, the neck portion 204 may have a cylindrical shape having a predetermined height (along the first vertical axis 121) and a third radius. Further, the neck portion 204 has a first end 216 and a second end 218 that are spaced apart from each other along the first vertical axis 121 to define the predetermined height of the neck portion 204. In some examples, the first end 216 of the neck portion 204 is coupled to the third end portion 212 of the base portion 202, while the second end 218 of the neck portion 204 is coupled to the seat portion 206.

In some examples, the third radius of the neck portion 204 is less than the second radius of the base portion 202. Further, the predetermined height of the neck portion 204 is equal to or greater than a width of the frames 102 (e.g., the width of the horizontal portion 117 of the first plate 110 of the frame 102a along the first vertical axis 121) such that the neck portion 204 of the axle mount 106a is receivable within the groove 114a of the frame 102a. Since the groove 104a has a circular shape and the neck portion 204 has a cylindrical shape, axle mount 106a is rotatable with respect to the groove 114a, when the axle mount 106a is received in the groove 114a. More particularly, the axle mount 106a is rotatable about the neck portion 204 with respect to the groove 114a. The reception of the axle mount 106a in the groove 114a is further described in conjunction with FIG. 3a and FIG. 3b. In some examples, the scope of the disclosure is not limited to the neck portion 204 having the cylindrical shape. In an example embodiment, the neck portion may have a square shape, a rectangular shape, and/or any other polygon shape, without departing from the scope of the disclosure.

As discussed, the seat portion 206 is disposed at the second end 218 of the neck portion 204 of the axle mount 106a. In some examples, the seat portion 206 has a cylindrical shape of fourth radius. In some examples, the fourth radius of the seat portion 206 is same as the first radius of the base portion 202. In some examples, the scope of the disclosure is not limited to the seat portion 206 having same radius and the radius of the base portion 202. In an example embodiment, the fourth radius of the seat portion 206 may be different from the first radius of the base portion 202. For example, the fourth radius may be greater than the first radius. In another example, the fourth radius may be less than the first radius. Additionally, the seat portion 206 has a surface 220, a fourth end portion 222, and the second end portion 210. The fourth end portion 222 is spaced apart from the second end portion 210 along the first vertical axis 121 defining a predetermined height of the seat portion 206.

The surface 220 of the seat portion 206 defines a first recess 226 that extends from the second end portion 210 towards the fourth end portion 222. In some examples, the first recess 226 corresponds to a rectangular cut-out in the seat portion 206 such that the first recess 226 defines a first wall 228, a second wall 230, a third wall 232, and a floor 234. The first wall 228 is spaced apart from the third wall 232 along the lateral axis 122 of the conveyor apparatus 100. Further, the first wall 228 is parallel to the third wall 232. In some examples, the second wall 230 is orthogonal to the first wall 228 and the third wall 232. Each of the first wall 228, the second wall 230, and the third wall 232 extend from the floor 234 towards the second end portion 210 of the axle mount 106a along the first vertical axis 121. The floor 234 is defined to be proximal to the fourth end portion 222 of the seat portion 206 and distal from the second end portion 210 of the axle mount 106a. In some examples, the floor 234, the first wall 228, the second wall 230, and the third wall 232 form an opening 236 when observed from the horizontal axis 108 of the conveyor apparatus 100. In an example embodiment, the opening 236 facilitates reception of the roller 104a, as is described in FIGS. 3a and 3b.

To facilitate coupling of the roller 104a with the axle mount 106a, in some examples, the surface 220 of the seat portion 206 defines a second recess 238 on the second wall 230. The second recess 238 facilitates coupling of the roller 104a with the axle mount 106. For example, the second recess 238 may facilitate snap fitting of the roller 104a with the axle mount 106a. In another example, the second recess 238 may facilitate press fitting of the roller 104a with the axle mount 106a. In some examples, the scope of the disclosure is not limited to the snap fitting or press fitting the roller 104a with the axle mount 106a (through the second recess 238). In an example embodiment, the second recess 238 may facilitate reception of nut and bolt that may be further used to couple the roller 104a with the axle mount 106a. Similarly, a person having ordinary skills in the art would envision other means of coupling the roller 104a with the axle mount 106a, without departing from the scope of the disclosure.

In another example, the surface 220 defines a rail 240 along a junction 242 between the first wall 228 and the second wall 230, and a junction 244 between the third wall 232 and the second wall 230. In an example embodiment, the rail 240 defined along the junction 242 and the junction 244 provide a path for the reception of the roller 104*a*. for example, the first end 118 of the roller 104*a* may slide along the rail 240 (defined along the junction 242 and the junction 244) to be received in the seat portion 206.

Further, the person having ordinary skills in the art would appreciate that the structure of the axle mount 106*a*, described in conjunction with FIG. 2 is also applicable to other axle mounts 106. For example, the other axle mounts 106 may also include the base portion 202, the neck portion 204, and the seat portion 206. Similar to the axle mount 106*a*, the other axle mounts 106 may have the surface 220 that defines the first recess 226 and the second recess 238, within the seat portion 206, that facilitate the receptions of the other rollers 104.

In an example embodiment, the base portion 202, the neck portion 204, and the seat portion 206 of the axle mount 106*a* are modular components such that each of the base portion 202, the neck portion 204, and the seat portion 206 are removable with respect to each other. In an alternate embodiment, the axle mount 106*a* is one single component such that the base portion 202, the neck portion 204, and the seat portion 206 are molded together as a piece.

Figure 3A:
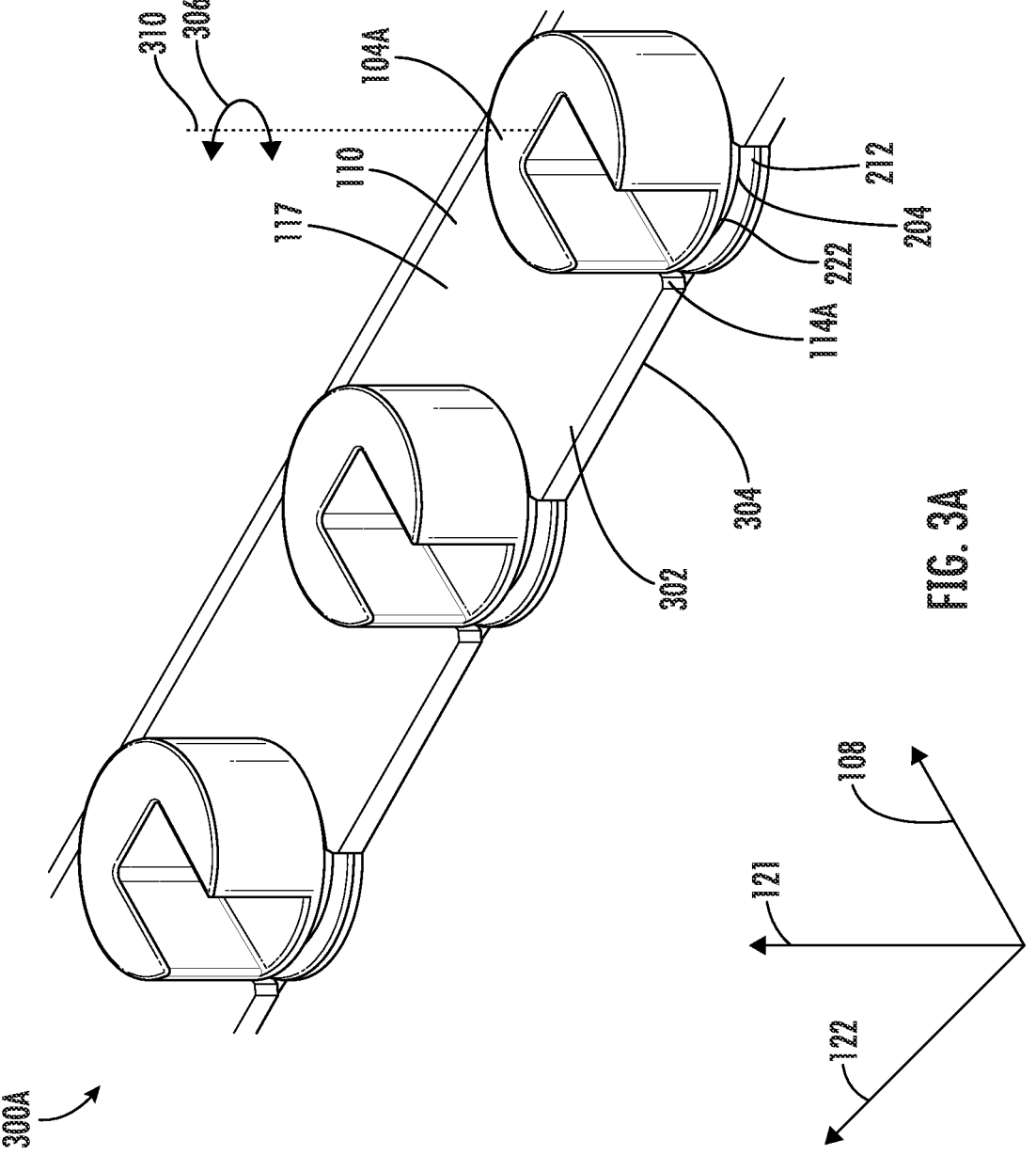

FIG. 3*a* and FIG. 3*b* illustrate a perspective view 300A and a side view 300B of the axle mount 106*a* mounted on the frame 102*a*, according to the one or more embodiments described herein.

Referring to the perspective view 300A and the side view 300B, the horizontal portion 117 of the first plate 110 (of the frame 102*a*) has a top section 302 and a bottom section 304. Further, it can be observed from the perspective view 300A, that when the axle mount 106*a* is received in the groove 114*a* (defined in the first plate 110), the fourth end portion 222 of the seat portion 206 abuts the top section 302, while the third end portion 212 of the base portion 202 abuts the bottom section 304 of the first plate 110. Additionally, it can be observed that the neck portion 204 of the axle mount 106*a* is received within the groove 114*a*. Furthermore, the height of the neck portion 204 is equal or greater than the width of the first plate 110 (e.g., the width of the horizontal portion 117 of the first plate 110 along the first vertical axis 121) allowing tight fitting of the axle mount 106*a* with the first plate 110 of the frame 102*a*. In some examples, the axle mount 106*a* is rotatable within the groove 114*a* about a second vertical axis 310 of the axle mount 106*a* first vertical axis 121 (as is depicted by direction 306). In an example embodiment, the second vertical axis 310 is parallel to the first vertical axis 121. In an example embodiment, the rotation of the axle mounts 106 about the first vertical axis 121 to facilitate installation of the rollers 104 in the one or more orientations as is further described in conjunction with FIG. 4*a*-4*d*.

Referring to the side view 300B, in some examples, the frame 102*a* may further include a second plate 308 that is similar to the first plate 110. The second plate 308 is positioned at an offset from the first plate 110 along the first vertical axis 121. Further, the second plate 308 abuts the second end portion 210 of the axle mount 106*a*. In some examples, the second plate 308 is optional and the frames 102 may be devoid of the second plate 308. In such scenario, the frames 102 may only include the first plate 110, without departing from the scope of the disclosure.

FIGS. 4A-4D illustrate one or more configurations 400*a*, 400*b*, 400*c* and 400*d* of the conveyor apparatus 100, according to one or more embodiments described herein.

Referring to the configuration 400*a*, the each of the rollers 104 are received in the aligned axle mounts 106. As discussed above in conjunction with FIGS. 1, 2, 3*a*, and 3*b*, the groove 114*a* on the frame 102*a* is aligned with the groove 114*b* on the frame 102*b* (i.e., the aligned grooves 126). To this end, when the axle mounts 106*a* and the axle mount 106*b* are received on the aligned grooves 126, the axle mount 106*a* and the axle mount 106*b* are aligned with each other (hereinafter referred to as aligned axle mounts 404). Accordingly, when the axle mount 106*a* and the axle mount 106*b* receives the roller 104*a*, the roller 104*a* is parallel to the horizontal axis 108 and the orthogonal to the lateral axis 122. Similarly, the other rollers 104 are received in the other aligned grooves 126. In some examples, the scope of the disclosure is not limited to receiving the roller 104*a* in the aligned axle mounts 404. In an example embodiment, the roller 104 may be received in pair of unaligned axle mounts, as is described in FIGS. 4*b*-4*d*.

Referring to the configuration 400*b*, the axle mount 106*a* may be rotated such that the opening 236 of the axle mount 106*a* points to the groove 114*d*, wherein the groove 114*d* is defined subsequent to the groove 114*b* along the lateral axis 122. Accordingly, the second radial axis 124 of the axle mount 106*a*, passing through the opening 236 and the center of the axle mount 106*d*, defines aa first angle with the horizontal axis 108. In some examples, the first angle between the second radial axis 124 and the horizontal axis 108 is greater than zero degrees. Accordingly, when the axle mount 106*a* and the axle mount 106*d* (received in the groove 114*d*) receive the roller 104*a*, the roller 104*a* is installed at the first angle with respect to the horizontal axis 108. Hereinafter such a configuration of installing the rollers 104, as is described in the FIG. 4*b*, is referred to as a skip groove configuration. Similarly, the other rollers 104 may also be installed in the skip groove configuration such that each of the rollers 104 are installed at the first angle with respect to the horizontal axis 108.

In some examples, the scope of the disclosure is not limited to the conveyor apparatus 100 being configured in the skip groove configuration. Referring to configuration 400*c*, in an alternate configuration, the rollers 104 may be installed in a double skip groove configuration. To this end, the axle mount 106*a* is rotated about the first vertical axis 121 such that the opening 236 points to the groove 114*f*, which is subsequent to the groove 114*d* along the lateral axis 122. Accordingly, the second radial axis 124 of the axle mount 106*a* defines a second angle with the horizontal axis 108. Accordingly, the first roller 104*a*, when received in the axle mount 106*a* and the axle mount 106*f* (received in the groove 114*f*), is installed at the second angle with the horizontal axis 108.

On similar lines, a person having ordinary skills in the art would envisage other configurations in which the rollers 104 may be installed. For example, the rollers 104 may be installed in the triple skip groove configuration, as is depicted in the configuration 400*d*.

Figure 5:
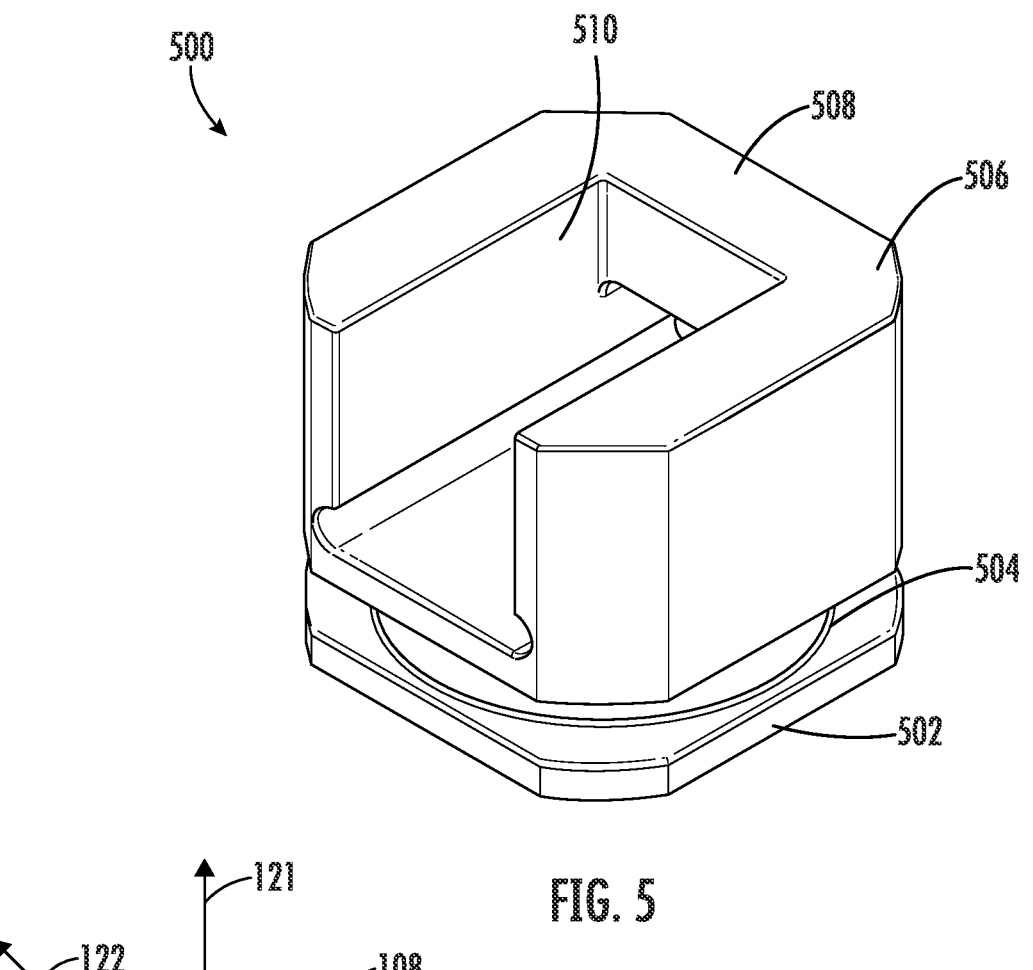
FIG. 5 illustrates a perspective view another axle mount, in accordance with one or more embodiments described herein.

FIG. 5 illustrates a perspective view of another axle mount 500, according to one or more embodiments described herein. In some examples, the other axle mount 500 is similar to the axle mount 106*a*. For example, the other axle mount 500 includes a base portion 502, a neck portion 504, and a seat portion 506. The structure of the base portion 502 of the axle mount 500 is same as the structure of the base portion 202 of the axle mount 106. For example, the base portion 502 includes the first end portion 208 and the third end portion 212.

In some examples, the base portion 502, the neck portion 504, and the seat portion 506 have a cuboidal shape (instead of the cylindrical shape of the base portion 202, the neck portion 204, and the seat portion 206). In an example embodiment, the structure of the seat portion 506 is similar to the structure of the seat portion 206. For example, the surface 508 of the seat portion 506 defines a third recess 510 that is similar the first recess 226. Further, the third recess 510 is configured to receive the roller 104a such that the roller 104a gets coupled with the other axle mount 500. For example, the seat portion 506 may further define a fourth recess (not shown) that facilitate press-fitting of the roller 104a with the axle mount 500. In some examples, the scope of the disclosure is not limited to snap fitting the roller 104a with the axle mount 500. In an example embodiment, the axle mount 500 may comprise features that may allow press-fitting of the roller 104a. One such axle mount is described in conjunction with FIG. 6.

FIG. 6 illustrates a perspective view of another axle mount 600, according to one or more embodiments described herein. In some examples, the axle mount 600 includes a base portion 602, a neck portion 604, and a seat portion 606. The base portion 602 and the neck portion 604 of the other axle mount 600 is similar to the base portion 502 and the neck portion 504 of the axle mount 500.

In an example embodiment, the seat portion 606 of the axle mount 600 has a surface 608 that defines a fifth recess 610 extending from the second end portion 210 towards the fourth end portion 222 of the other axle mount 600. Further, the fifth recess 610 defines a first wall 616, a second wall 618, and a third wall 620. The first wall 616 and the third wall 620 are parallel to each other, while the second wall 618 is orthogonal to the first wall 616 and the third wall 620. Furthermore, the first wall 616, the second wall 618 and the third wall 620 define the opening 236.

In an example embodiment, each the first wall 616 and the third wall 620 define a first wall section 622 and a snap-fit section 624. The first wall section 622 is distal from the second wall 618 such that the snap-fit section 624 is defined between the first wall section 622 and the second wall 618. Further, the snap-fit section 624 on the first wall 616 and the third wall 620, are inclined at a first predetermined angle and the second predetermined angle, with respect to the first vertical axis 121 of the conveyor apparatus 100, respectively. To this end, the first predetermined angle and the second predetermined angle are so defined that the snap-fit section 624 on the first wall 616 and the snap-fit section 624 on the third wall 620 are inclined towards each other. The inclination of the snap-fit section 624 facilitates snap fitting the roller 104a with the axle mount 600.

In some examples, the scope of the disclosure is not limited to the fifth recess 610 defining the second wall 618. In some examples, the seat portion 606 may be devoid of the second wall 230. On such structure of the seat portion is described in conjunction with FIG. 7.

Figure 7:
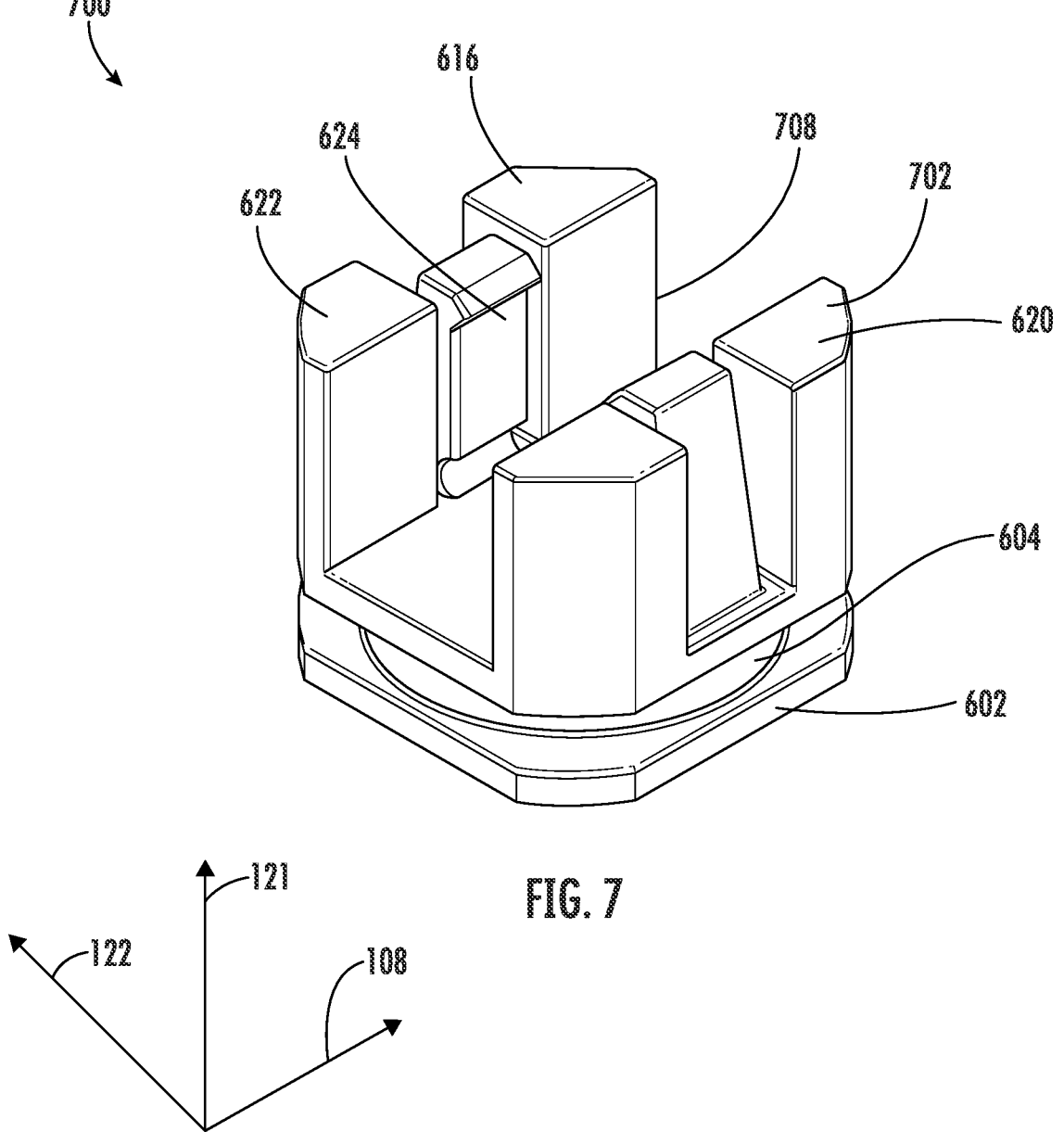
FIG. 7 illustrates a perspective view of yet another axle mount, in accordance with one or more embodiments described herein.

FIG. 7 illustrates another perspective view of yet another axle mount 700, according to one or more embodiments illustrated herein. The other axle mount comprises the base portion 602, the neck portion 604, and a seat portion 702. The structure of the seat portion 702 is mostly similar to the structure of the seat portion 606. For example, the seat portion 702 includes a sixth recess 708, the first wall 616 and the third wall 620. Furthermore, the first wall 616 includes the first wall section 622 and the snap-fit section 624. However, the seat portion 706 is devoid of the second wall 618.

In some examples, the scope of the disclosure is not limited to each of the base portion 602, the neck portion 604, and the seat portion 606 having the cuboidal shape. In an example embodiment, only the seat portion 606 may have the cuboidal shape, while the base portion 602 and the neck portion 604 have a cylindrical shape. A person having ordinary skills in the art would envisage other permutations combinations of the shapes of the base portion 602, the neck portion 604, and the seat portion 606, without departing from the scope of the disclosure.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An axle mount comprising:
a base portion;
a neck portion extending out from the base portion, the neck portion being rotatably receivable on a frame of a conveyor apparatus, wherein the base portion and the neck portion have a circular shape, and wherein the circular shape of the neck portion and the base portion facilitates rotation of the axle mount about a first vertical axis of the axle mount, wherein the neck portion is receivable in a groove defined on the frame of the conveyor apparatus such that the axle mount is rotatable about the neck portion with respect to the groove to facilitate reception of a roller in one or more orientations; and
a seat portion disposed on the neck portion, the seat portion having a surface defining a first recess to receive an end of the roller.

2. The axle mount of claim 1, wherein a radius of the base portion is greater than a radius of the neck portion.

3. The axle mount of claim 1, wherein the surface of the seat portion defines one or more rails within the first recess to facilitate reception of the end of the roller.

4. The axle mount of claim 1, wherein the surface of the seat portion defines a second recess within the first recess, wherein the second recess locks the roller within the first recess.

5. The axle mount of claim 1, wherein at least one of the base portion and the neck portion have a polygon shape.

6. The axle mount of claim 1, wherein the first recess defines a first wall, a second wall, a third wall, and a floor, wherein the first wall, the second wall, and the third wall define an opening, wherein the axle mount further comprises a first end portion and a second end portion, wherein the second end portion is spaced apart from the first end portion along a second vertical axis of the conveyor apparatus, wherein each of the first wall, the second wall, and the third wall extend from the floor towards the second end portion of the axle mount along the second vertical axis of the conveyor apparatus, wherein the first vertical axis of the axle mount is parallel to the second vertical axis of the conveyor apparatus.

7. The axle mount of claim 1, wherein a height of the neck portion is equal to or greater than a width of a plate of the frame that defines the groove, such that, when the neck portion is received within the groove, the axle mount is tightly fitted to the plate.

8. The axle mount of claim 6, wherein each of the first wall and the third wall includes a snap-fit section inclined at a respective predetermined angle such that the snap-fit section of the first wall and the snap-fit section of the third wall are inclined toward each other to facilitate snap fitting of the end of the roller within the first recess.

9. The axle mount of claim 6, wherein the seat portion is devoid of the second wall.

10. A conveyor apparatus comprising:

one or more frames having a surface defining one or more grooves along a lateral axis of the conveyor apparatus, wherein the lateral axis is defined along a conveyance path of the conveyor apparatus;

at least one axle mount receivable in at least one groove of the one or more grooves, wherein the at least one axle mount comprises:

a base portion;

a neck portion extending out from the base portion, the neck portion being rotatably receivable in the at least one groove, wherein the base portion and the neck portion have a circular shape, and the circular shape of the neck portion and the base portion facilitates rotation of the axle mount about a first vertical axis of the axle mount, wherein the neck portion is receivable in the at least one groove defined on the one or more frames of the conveyor apparatus such that the at least one axle mount is rotatable about the neck portion with respect to the at least one groove to facilitate reception of a roller in one or more orientations; and a seat portion disposed on the neck portion, the seat portion having a surface defining a first recess to receive an end of the roller.

11. The conveyor apparatus of claim 10, wherein a radius of the base portion is greater than a radius of the neck portion.

12. The conveyor apparatus of claim 10, wherein the surface of the seat portion defines one or more rails within the first recess to facilitate reception of the end of the roller.

13. The conveyor apparatus of claim 10, wherein the surface of the seat portion defines a second recess within the first recess, wherein the second recess locks the roller within the first recess.

14. The conveyor apparatus of claim 10, wherein at least one of the base portion and the neck portion have a polygon shape.

15. The conveyor apparatus of claim 10, wherein the first recess defines a first wall, a second wall, a third wall, and a floor, wherein the first wall, the second wall, and the third wall define an opening of the first recess, wherein the at least one axle mount further comprises a first end portion and a second end portion, wherein the second end portion is spaced apart from the first end portion along a second vertical axis of the conveyor apparatus, wherein each of the first wall, the second wall, and the third wall extend from the floor towards the second end portion of the at least one axle mount along the second vertical axis of the conveyor apparatus, wherein the first vertical axis of the at least one axle mount is parallel to the second vertical axis of the conveyor apparatus.

16. The conveyor apparatus of claim 10, wherein a height of the neck portion of the at least one axle mount is equal to or greater than a width of a plate of the one or more frames that defines the at least one groove, such that the at least one axle mount is tightly fitted to the plate when received in the at least one groove.

17. The conveyor apparatus of claim 15, wherein each of the first wall and the third wall includes a snap-fit section inclined at a respective predetermined angle such that the snap-fit sections are inclined toward each other to facilitate snap fitting of the end of the roller within the first recess.

18. The conveyor apparatus of claim 15, wherein at least one of the one or more frames further comprises a second plate positioned at an offset from a first plate of the one or more frames defining the at least one groove, and wherein the second plate abuts the second end portion of the at least one axle mount when the at least one axle mount is received in the at least one groove.

19. The conveyor apparatus of claim 15, wherein the seat portion is devoid of the second wall.

* * * * *